US006870703B2

(12) United States Patent
Hoelsaeter et al.

(10) Patent No.: US 6,870,703 B2
(45) Date of Patent: Mar. 22, 2005

(54) DUAL FEED THROUGH CASSETTE TRANSFER APPARATUS

(75) Inventors: Haavard Hoelsaeter, Oslo (NO); Truls Simensen, Hagan (NO)

(73) Assignee: Tandberg Data ASA, Oslo (NO)

( * ) Notice: Subject to any disclaimer, the term of this patent is extended or adjusted under 35 U.S.C. 154(b) by 194 days.

(21) Appl. No.: 10/102,227

(22) Filed: Mar. 20, 2002

(65) Prior Publication Data

US 2003/0112549 A1 Jun. 19, 2003

Related U.S. Application Data

(60) Provisional application No. 60/341,656, filed on Dec. 14, 2001.

(51) Int. Cl.[7] .............................................. G11B 15/68
(52) U.S. Cl. ...................................................... 360/92
(58) Field of Search .............................. 360/92, 90, 91, 360/93, 94, 95; 369/30.3; 235/383

(56) References Cited

U.S. PATENT DOCUMENTS

| | | | | |
|---|---|---|---|---|
| 4,802,035 A | * | 1/1989 | Ohtsuka | 360/92 |
| 4,812,629 A | * | 3/1989 | O'Neil et al. | 235/383 |
| 4,910,619 A | | 3/1990 | Suzuki et al. | 360/92 |
| 5,285,335 A | * | 2/1994 | Sato | 360/92 |
| 5,303,214 A | * | 4/1994 | Kulakowski et al. | 369/30.3 |
| 5,461,518 A | | 10/1995 | Saiki et al. | |

FOREIGN PATENT DOCUMENTS

| | | |
|---|---|---|
| DE | 38 31 565 A1 | 4/1989 |
| GB | 2 209 864 A | 5/1989 |
| GB | 2209864 A | 5/1989 |
| JP | 56-65360 | 6/1981 |
| JP | 560065360 A | 6/1981 |
| JP | 62239372 A | * 10/1987 |

* cited by examiner

Primary Examiner—Tianjie Chen
(74) Attorney, Agent, or Firm—Schiff Hardin LLP (57) ABSTRACT

A cassette transfer apparatus includes a shuttle having four transfer openings through which cassettes are moved. The shuttle is movable along a longitudinal path between a tape drive and a feed slot, and is movable vertically to access vertically disposed storage slots in storage bins. The storage bins are disposed on either side of the path, so that the shuttle is positionable at each of the storage slots. The shuttle includes cassette transfer apparatus which is operable to moved the cassette into and out of the shuttle through the four transfer openings so as to move the cassette into and out of the storage slots in the storage bins, and the tape drive and the feed slot. The cassette transfer apparatus of a preferred embodiment includes belts each provided with a tab to push the cassette as the belt moves.

5 Claims, 11 Drawing Sheets

DUAL FEED THROUGH CASSETTE TRANSFER APPARATUS

CROSS REFERENCE TO RELATED APPLICATION

This application claims the benefit of Provisional Patent Application Ser. No. 60/341,656 filed Dec. 14, 2001.

BACKGROUND OF THE INVENTION

1. Field of the Invention

The present application relates generally to a cassette transfer apparatus, and in particular to a cassette transfer apparatus which feeds the cassette in two substantially perpendicular directions.

2. Description of the Related Art

Data storage demands are increasing as ever more data is available in electronic format. Security of the data demands that backup copies of the data be made on a periodic basis. Data backup has been performed on magnetic tapes, and as a result of increasing data volume the capacities of the tape cassettes has increased. However, data volume has grown faster than tape cassette capacity so it is may no longer be possible to use a single tape cassette for data storage and/or backup.

During a data backup or storage processes, technical personnel may be required to monitor the progress of the backup or storage and remove tape cassettes that are full and replace them with other cassettes. It would be an improvement if an automated apparatus were provided to change out the tape cassettes and replace the cassette with another cassette without human intervention.

SUMMARY OF THE INVENTION

The present invention provides a tape cassette handing apparatus for automated transfer of tape cassettes between tape recording/playback equipment and a storage facility. The present apparatus preferably permits the transfer of the tape cassettes in four perpendicular directions, including to and from a tape recording/playback apparatus, to and from storage bins on one side, and preferably two opposite sides, of the transfer apparatus. In a preferred embodiment, the present transfer apparatus accepts cassettes which are manually inserted into the apparatus and transport the cassettes to either the recording/playback apparatus or the storage bins.

DETAILED DESCRIPTION OF THE PREFERRED EMBODIMENTS

Figure 1:
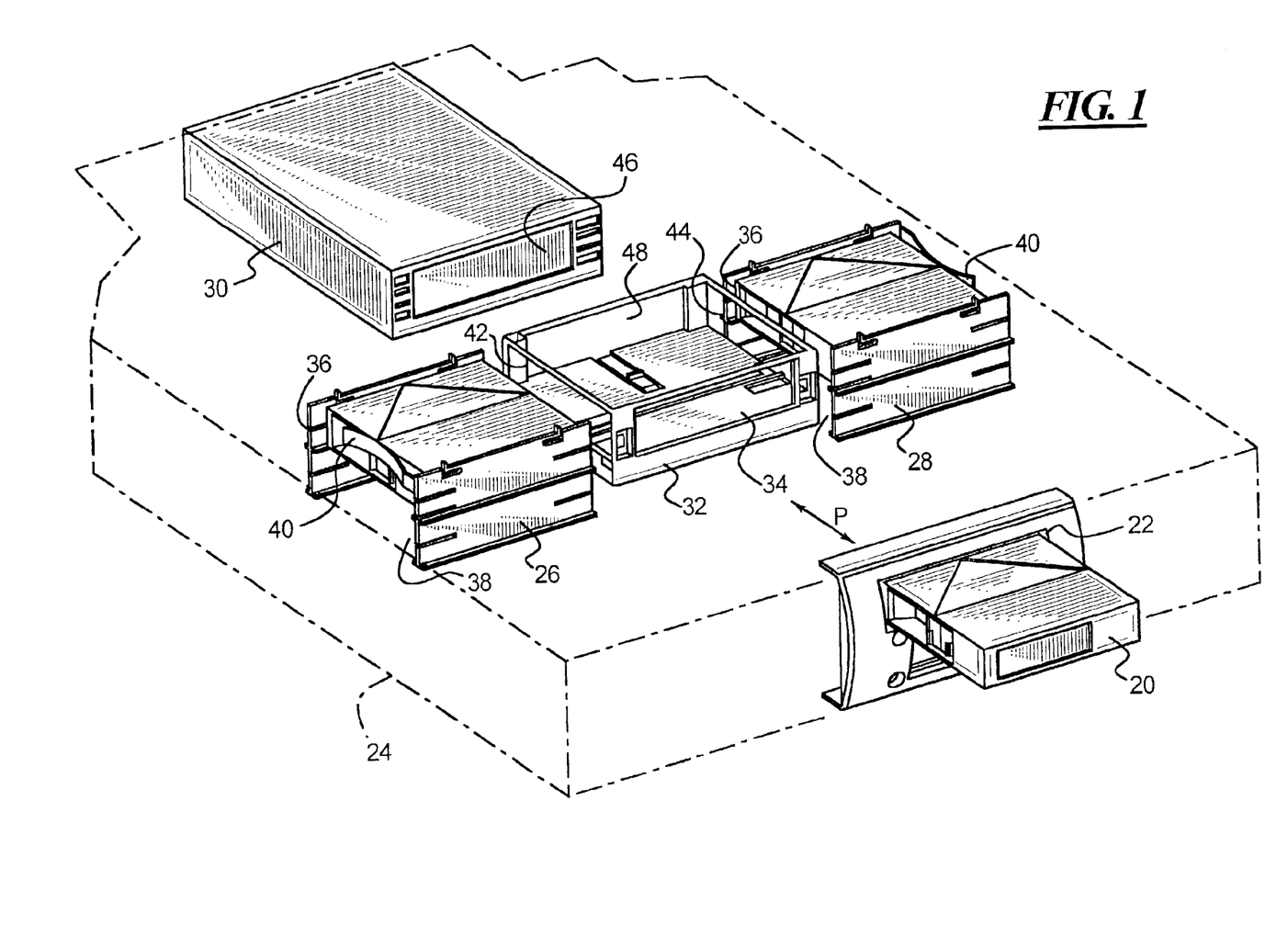
FIG. 1 is a perspective view of the present dual feed through cassette transport apparatus including storage bins, a manual feed slot, and a recording/playback apparatus.

Referring first to FIG. 1, a cassette 20 containing a recording medium, such as a magnetic tape, is being inserted into a feed slot 22 in a cassette transport apparatus according to the present invention. The feed slot 22 provides an entry into a housing 24 enclosing the cassette transport apparatus of the present invention. Within the housing 24 is provided is provided storage bins 26 and 28, a tape drive 30 and a shuttle 32 of the tape transport apparatus. The feed slot 22 may provide the only user accessible entry into the housing 24, or the housing may have additional user accessible openings. As will be described in further detail hereinafter, the shuttle 32 moves to the feed slot 22 to accept the cartridge 20 when the cartridge is inserted into the feed slot 22 by a user. Similarly, the shuttle 32 may carry a cartridge to the feed slot 22 for transfer of the cassette 20 out of the housing 24 through the feed slot 22. The cassette 20 is accepted into the shuttle 32 through the opening 34.

Within the housing 24 are included the two storage bins 26 and 28, which are positioned adjacent the path P of the shuttle 32, which is indicated by an arrow. For the sake of simplicity in the drawing, the storage bins 26 and 28 are shown with only a single storage slot 36 on the upper level and a single storage slot 38 on the lower level. However, the storage bins 26 and 28 are preferably formed to provide a plurality of side-by-side slots for storage of cassettes 20. Additionally, the storage bins 26 and 28 may have three or more levels in which to store the cassettes 20. On the other hand, it is foreseeable that less storage capacity may be needed in some applications and so storage bins with fewer slots may be provided, and in some cases a storage bin on only a single side of the shuttle 32 may be provided, or the storage bins may be only of a single level. This has the advantage that the housing 24 could be smaller.

Each of the storage slots 36 and 38 in the storage bins 26 and 28 is sized and shaped to accept a cassette 20. Each slot 36 and 38 also has a spring 40, such as a leaf spring, which biases the cassette 20 out of the slot and toward the shuttle 32. The springs 40 are show on only two of the slots in the drawing for the sake of simplicity, but are to be provided at each slot.

When the shuttle 32 is positioned adjacent a slot 36, a cassette 20 may be transferred between the slot 36 and the shuttle 32 through side openings 42 and 44 in the shuttle 32. The shuttle 32 may thus be used to accept a cassette 20 inserted into the feed slot 22 and transport the cassette 20 to one of the storage slots 36 or 38 in the storage bins 26 and 28. Likewise, the shuttle 32 may receive a cassette 20 from a slot 36 or 38 in the storage bins 26 and 28 and transport the cassette 20 to the feed slot 22 for transfer out of the housing 24 to a user.

The tape drive 30 is provided at an opposite end of the shuttle 32 path P from the feed slot 22. The tape drive 30 may be provided inside the housing 24 or affixed to the housing 24 at a back side thereof. The tape drive 30 has a cassette acceptance opening 46 into which the cassette 20 is inserted to undertake a recording and/or playback operation. The shuffle 32 moves the cassette 20 to the tape drive 30 and takes the cassette 20 away through an opening 48 in the shuttle 32. The shuttle 32 thus transports a cassette 20 between the storage bins 26 and 28 and the tape drive 30 and the feed slot 22 by movement of the cassette 20 in two orthogonal directions through the four openings 34, 42, 48 and 44 in the shuttle 32. The tape drive 30 is any of the known type of cassette recording and playback devices, or some other type to be developed in the future, and is used to record and/or play back computer data, programs, audio-visual formation, etc.

Figure 2:
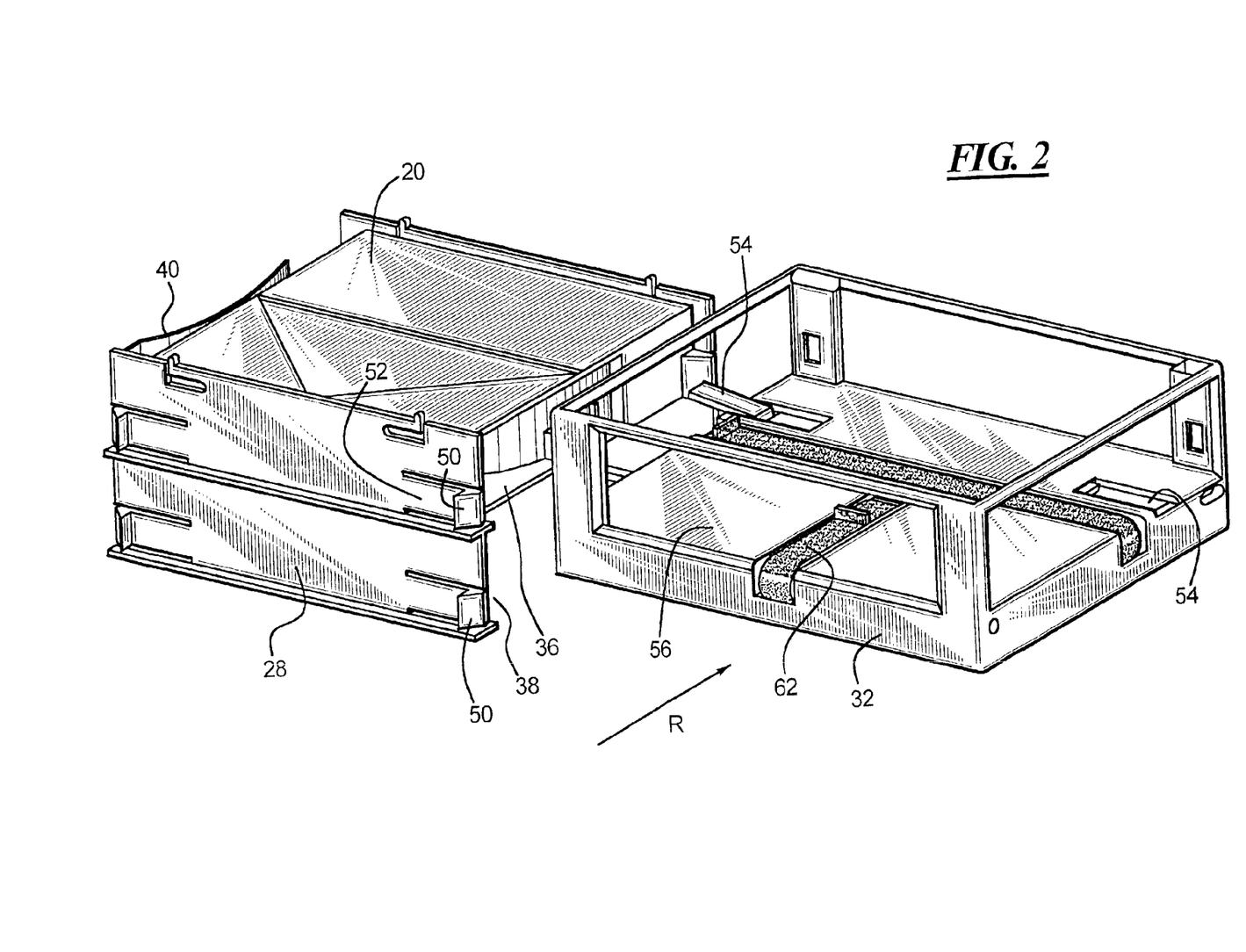
FIG. 2 is perspective view of the cassette transport apparatus releasing a cassette from the storage bin.

Referring to FIG. 2, the storage bin 28 is shown with a cassette 20 in the top slot 36. Each of the slots in the storage bins are provided with a catch 50 that includes a projection extending from a flex arm 52. The projection 50 extends into the slot 36 far enough to engage the cassette 20 and retain it in the slot 36 against the force of the spring 40.

The flex arm 52 is pushed aside to permit the cassette to be inserted into the slot 36 and springs back to engage and hold the cassette 20 in the slot 36.

To release the cassette 20 from the grasp of the catch 50, the shuttle 32 has a kicker element 54. The kicker 54 is movable between a position flush with or recessed into a floor 56 of the shuttle 32, and a position extending outward and upward from the floor 56 of the shuttle 32. The kicker 54 slides between the extended and retracted positions as shown, for example, by the kicker 54 to the left side of the shuttle 32 in FIG. 2 in the extended position and the kicker 54 to the right side of the shuttle in the retracted position. The kicker 54 is moved, for example, by a solenoid (not shown), and includes a ramp or cam element to cause the upward extension during the lateral movement.

FIG. 2 shows the left kicker element 54 extending upward and outward and into contact with the catch 50 of the slot 36. By movement of the shuttle 32 in the direction of arrow R with the kicker 54 extended, the catch 50 is released from engaging the cassette 20. This permits the leaf spring 40 to push the cassette 20 out of its stored position in the slot 36.

Figure 3:
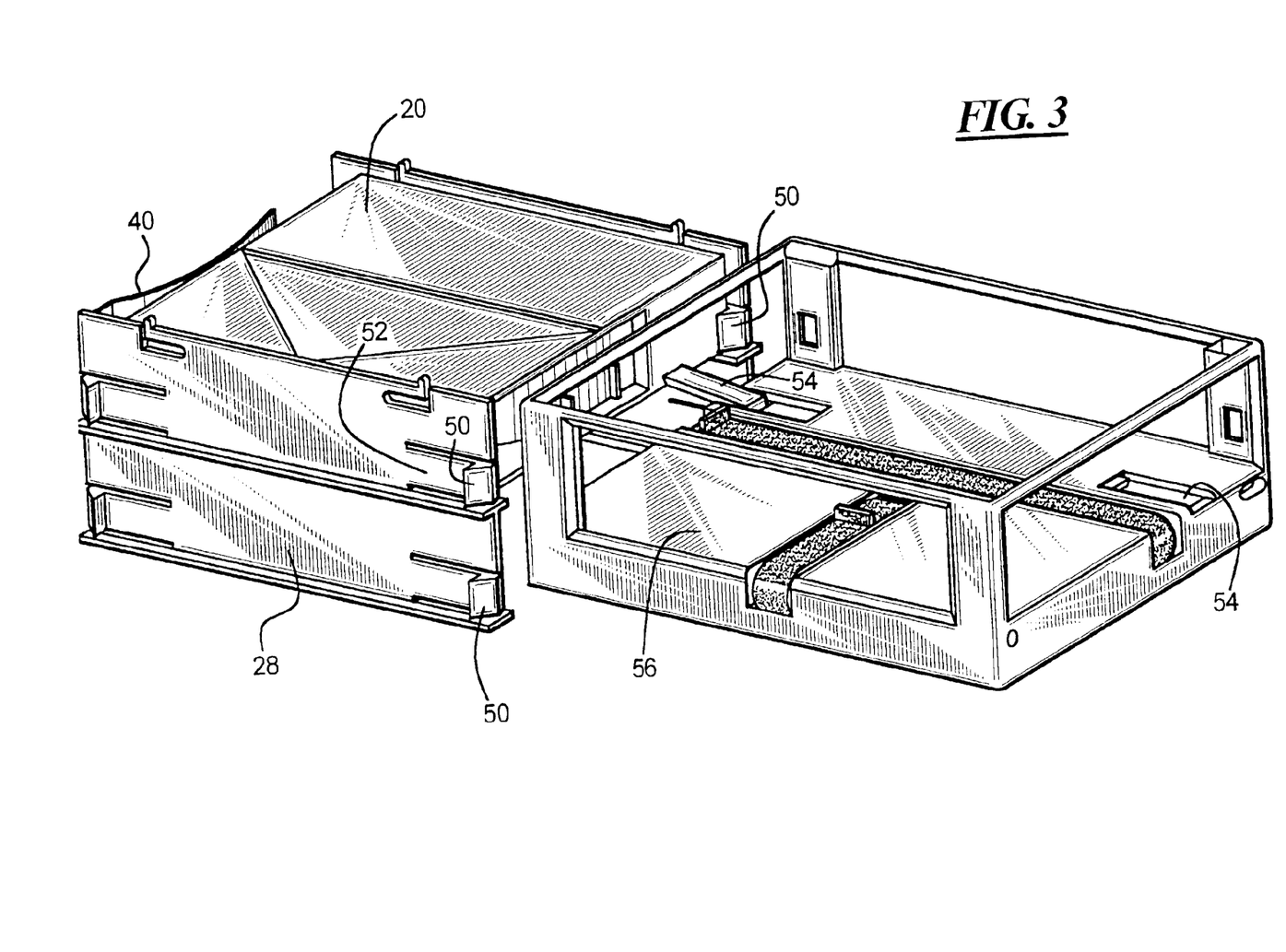
FIG. 3 is an enlarged perspective view of the cassette transport apparatus returning a cassette to the storage bin.

Return of the cassette 20 to the slot 36 is shown in FIG. 3, wherein the cassette 20 has been positioned in the slot 36 and moved most of the way in. The kicker 54 is moved from the recessed position to the extended position, as shown, which causes the kicker element 54 to engage the end surface of the cassette 20 and push the cassette 20 into the slot 36. Preferably, the kicker 54 pushes the cassette 20 until the catch 50 engages the end surface of the cassette 20 to hold the cassette 20 in place. During the pushing motion of the kicker 54, the spring 40 is pushing back, so the kicker 54 must act with sufficient force to overcome the effect of the spring 40.

Figure 4:
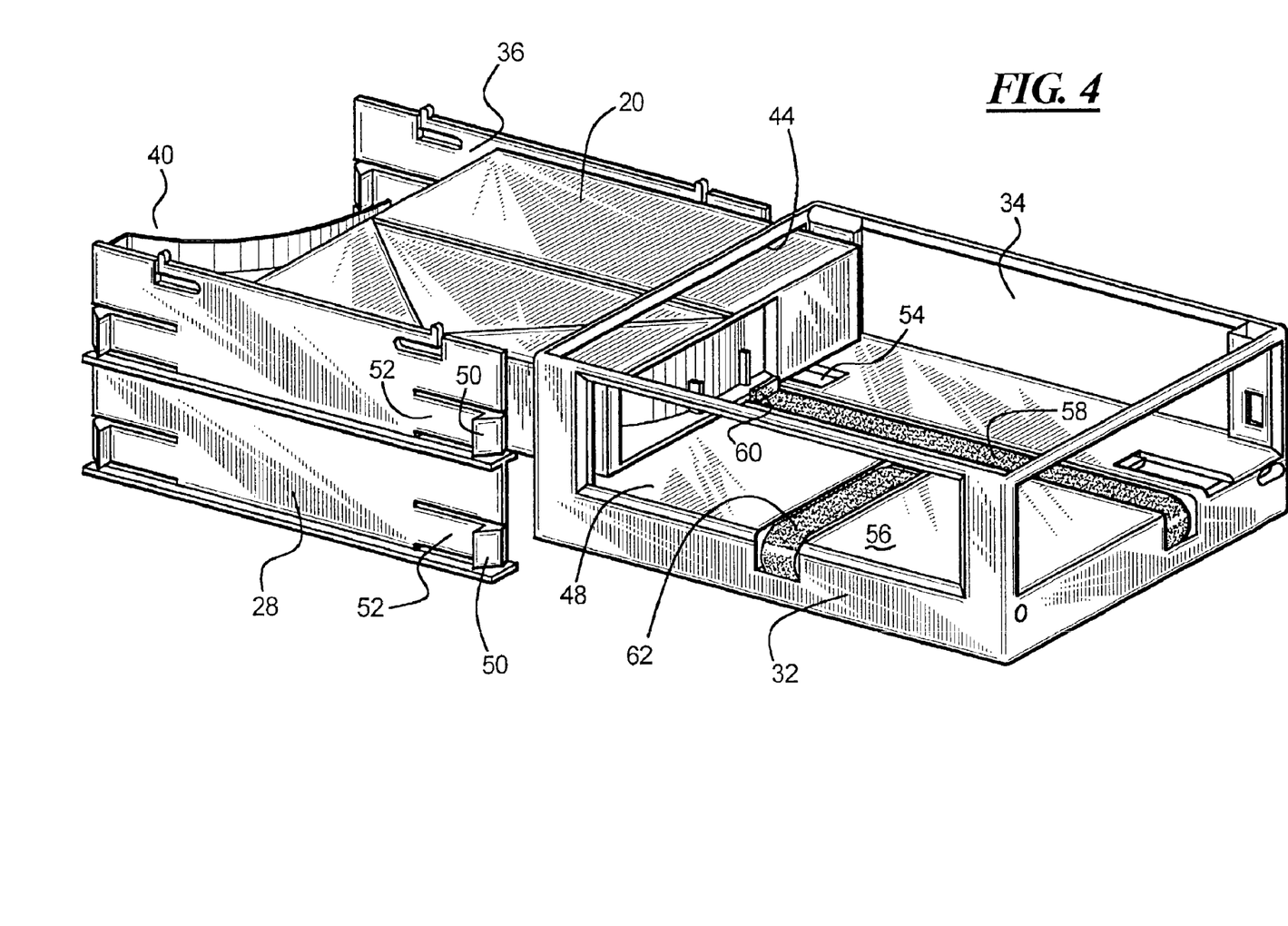
FIG. 4 is an enlarged perspective view of the cassette transport apparatus receiving a cassette from the storage bin after release of a catch.

FIG. 4 shows the cassette 20 as is it being moved into the slot 36 of the storage bin or being received therefrom. The cassette 20 is extending through the opening 44 and resting on the floor 56 of the shuttle 32. The floor 56 of the shuttle 32 has a belt 58 which is raised above the floor 56 enough to frictionally engage the cassette 20 as the cassette 20 rests thereon. The belt 58 moves in a direction of motion of the cassette 20 as the cassette is moved into and out of the storage slot 36 so that the operation of the belt 58 is used to carry the cassette 20 between the shuttle 32 and the storage slot 36.

The frictional engagement of the cassette 20 on the belt 58 may not be enough to move the cassette 20 if there is resistance. As such, a tab 60 is provided extending vertically from the belt 58. The tab 60 presses the end surface of the cassette 20 to exert a pressing motion on the cassette 20 during movement of the belt 58. The belt 58 extends all the way across the lateral extent of the shuttle 32. The same belt 58 is used to move the cassette 20 into and out of either storage bin 26 and 28 on either side of the shuttle 32.

A second belt 62 is also provided in the floor 56 of the shuttle 32. The second belt 62 extends in a direction transverse to the direction of the belt 58 and thus moves the cassette 20 in the transverse direction, as will be described later.

Figure 5:
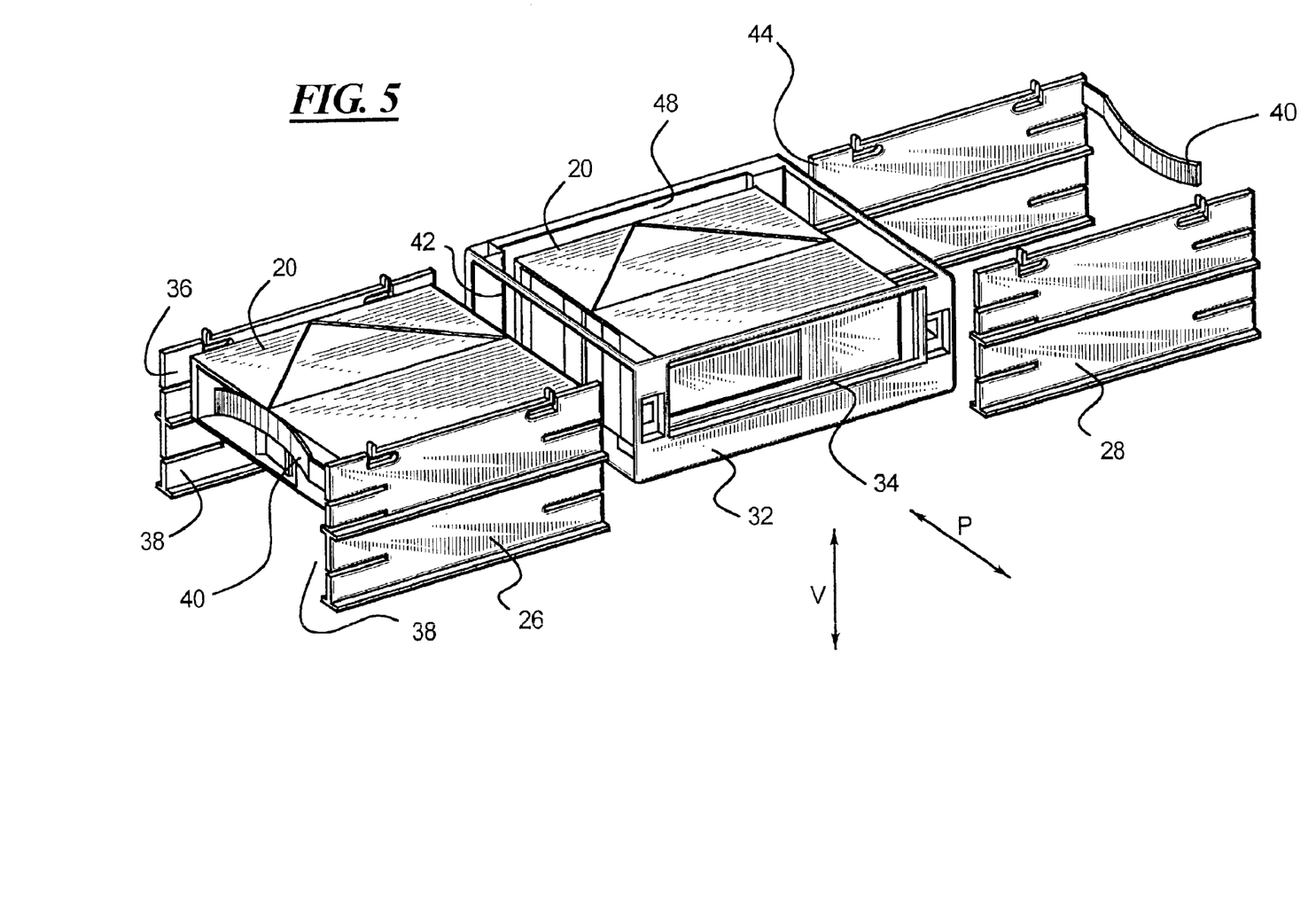
FIG. 5 is a perspective view of the cassette transport apparatus holding a cassette received from the bin.

FIG. 5 shows a view of the cassette 20 in position in the shuttle 32. The cassette 20 has been pulled into the shuttle 32 by the operation of the belt 58 and is centered in the shuttle 32. The position of the cassette 20 shown in the figure is referred to as the shuttle transport position, for the reason that the movement of the shuttle 32 in the path direction P and/or in a vertical direction V, as indicated by an arrow, transports the cassette 20.

Figure 6:
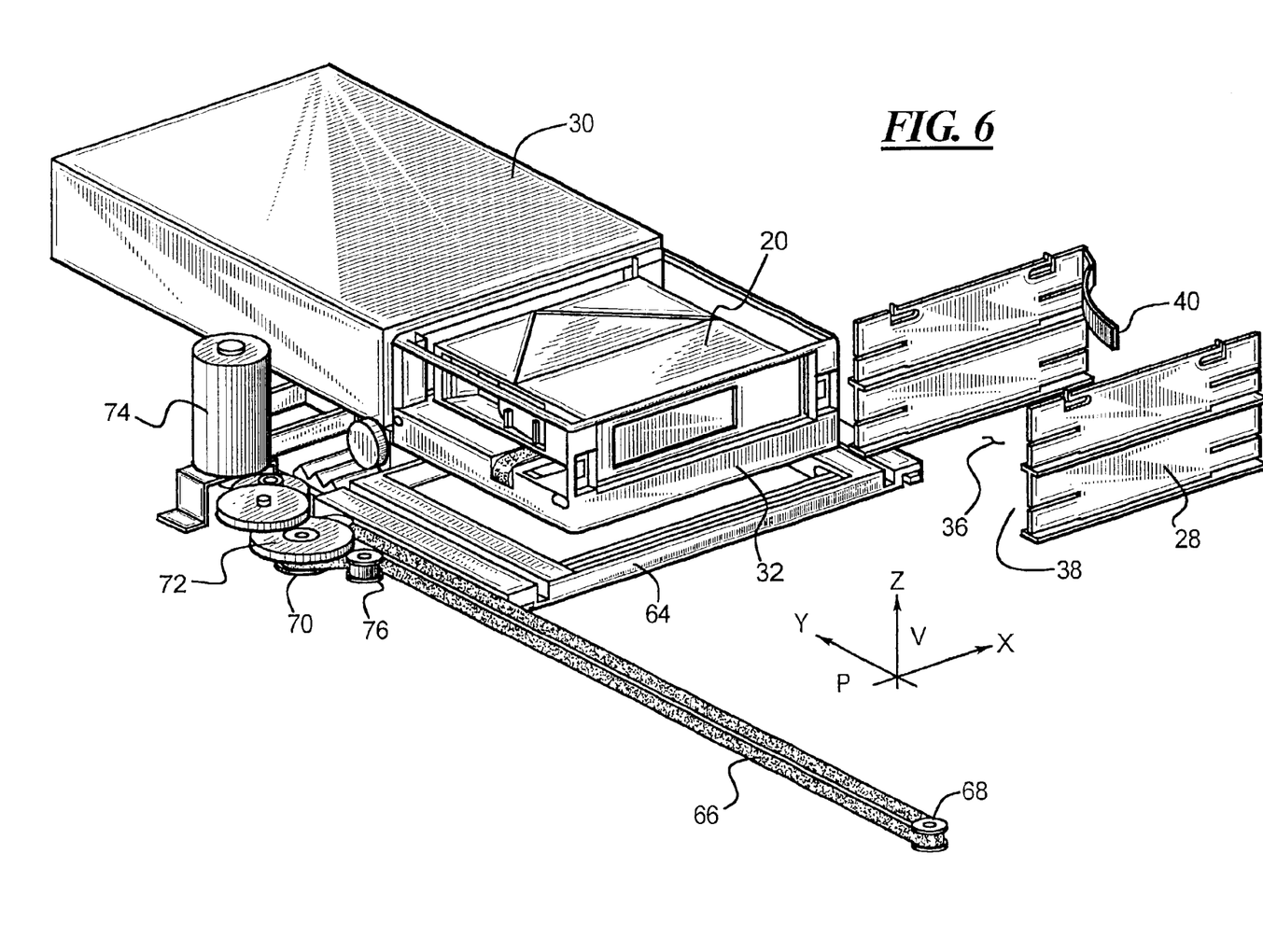
FIG. 6 is a perspective view of the cassette transport apparatus initiating loading of a cassette into a recording/playback apparatus.

FIG. 6 shows the apparatus for movement of the shuttle 32 in the P direction, also denoted the y direction on the coordinate system. Specifically, the shuttle 32 is supported on a platform 64. The platform 64 is movable in the P direction such as on rollers or bearings or the like. A belt 66 is attached to the platform 64 and extends around a pulley 68 and a drive pulley 70. The drive pulley 70 is driven through a gear train 72 and a motor 74. An idler pulley 76 is provided for proper tension in the belt 66. Through the operation of the motor 74 in the forward and reverse directions, the belt 66 carries the platform 64 back and forth in the P direction, which positions the shuttle 32 at the tape drive 30, at the storage bins 26 and 28, or at the feed slot 22.

Figure 7:
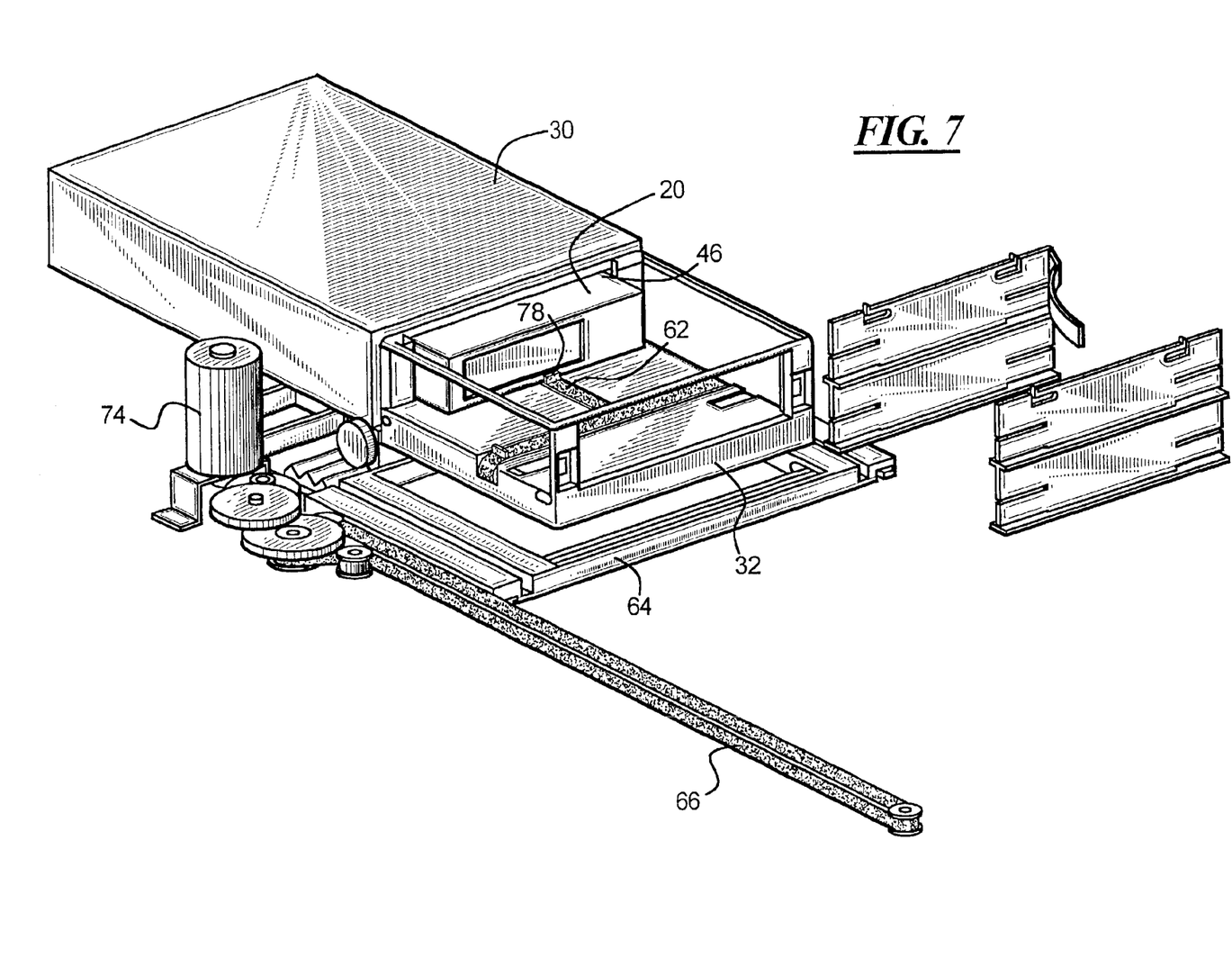
FIG. 7 is a perspective view of the cassette transport apparatus completing loading of the cassette into the recording/playback apparatus.

In FIG. 7 is shown the insertion of the cassette 20 into the tape drive 30. The shuttle 32 has been moved to the front of the tape drive 30 using the belt 66 and motor 74 with a cassette 20 held therein in the transport position. The belt 62 is operated to move the cassette 20 into the cassette acceptance opening 46 by frictional engagement. As there is likely to be resistance to movement of the cassette 20 into the opening 46, the belt 62 includes a tab 78 when engages an end face of the cassette 20 and pushes the cassette 20 into the recording/playback position in the tape drive 30. In particular, the belt 62 frictionally moves the cassette 20 until the resistance to movement of the cassette 20 by the tape drive 30 overcomes the frictional forces between the belt 62 and the cassette 20, at which point the belt 62 slips under the cassette 20. The slippage continues until the tab 78 moves into place behind the back of the cassette 20, so that the belt 62 more positively engages the cassette 20 and finalizes the positioning of the cassette 20 in the drive 30.

Figure 8:
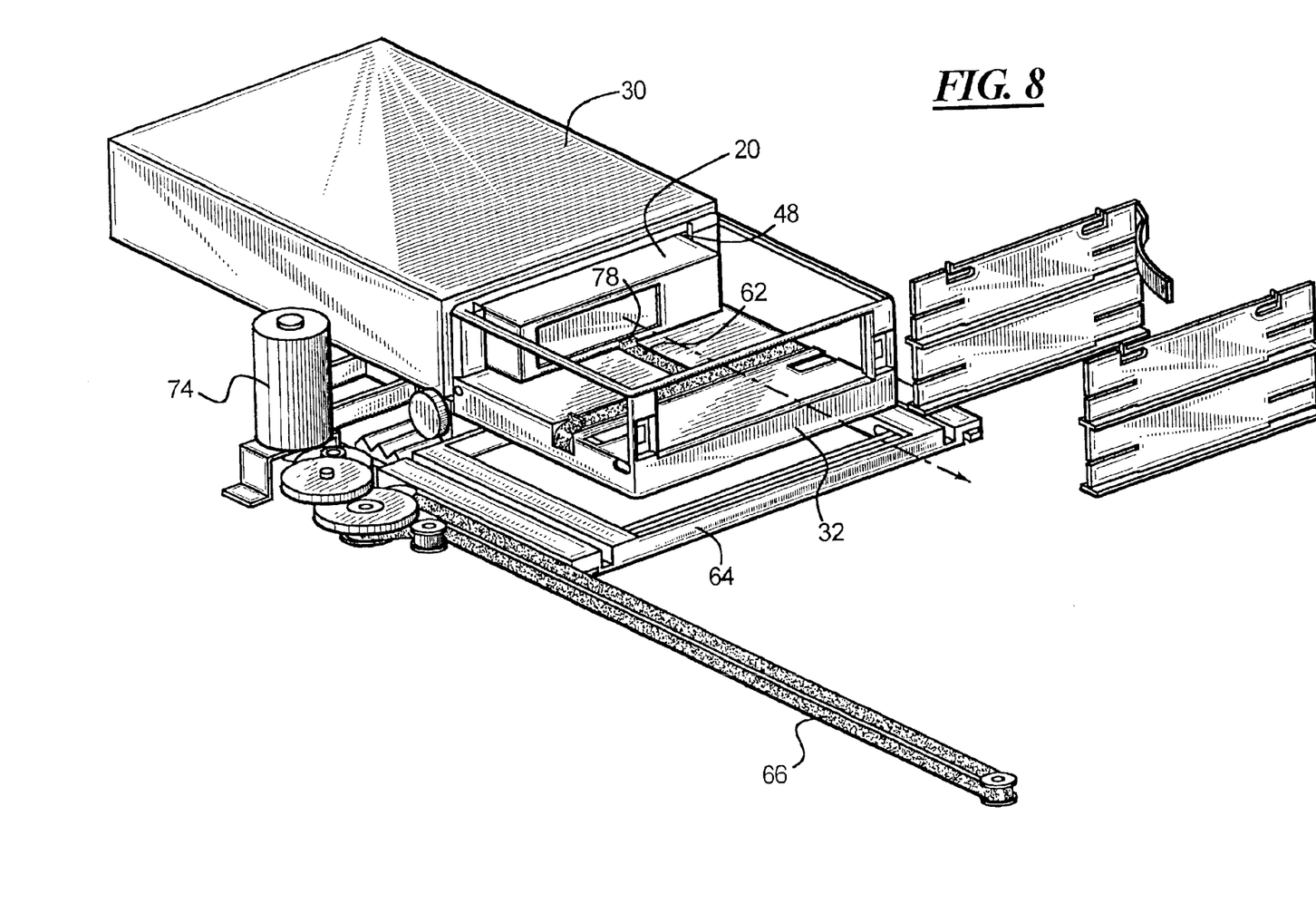
FIG. 8 is a perspective view of the cassette transport apparatus receiving a cassette from the recording/transport apparatus.

After the tape drive 30 has finished recording or playing back from the cassette 20, the cassette 20 is ejected by the tape drive 30. The ejection action only partially ejects the tape 20 so that the cassette 20 must be removed the rest of the way from the tape drive 30. The shuttle 32 moves to the front of the tape drive 30, receives the cassette 20 through the opening 48 of the shuttle 32, and frictionally engages the cassette 20 with the belt 62. The belt 62 is operated to draw the cassette 20 into the shuttle 32 into the transport position.

Figure 9:
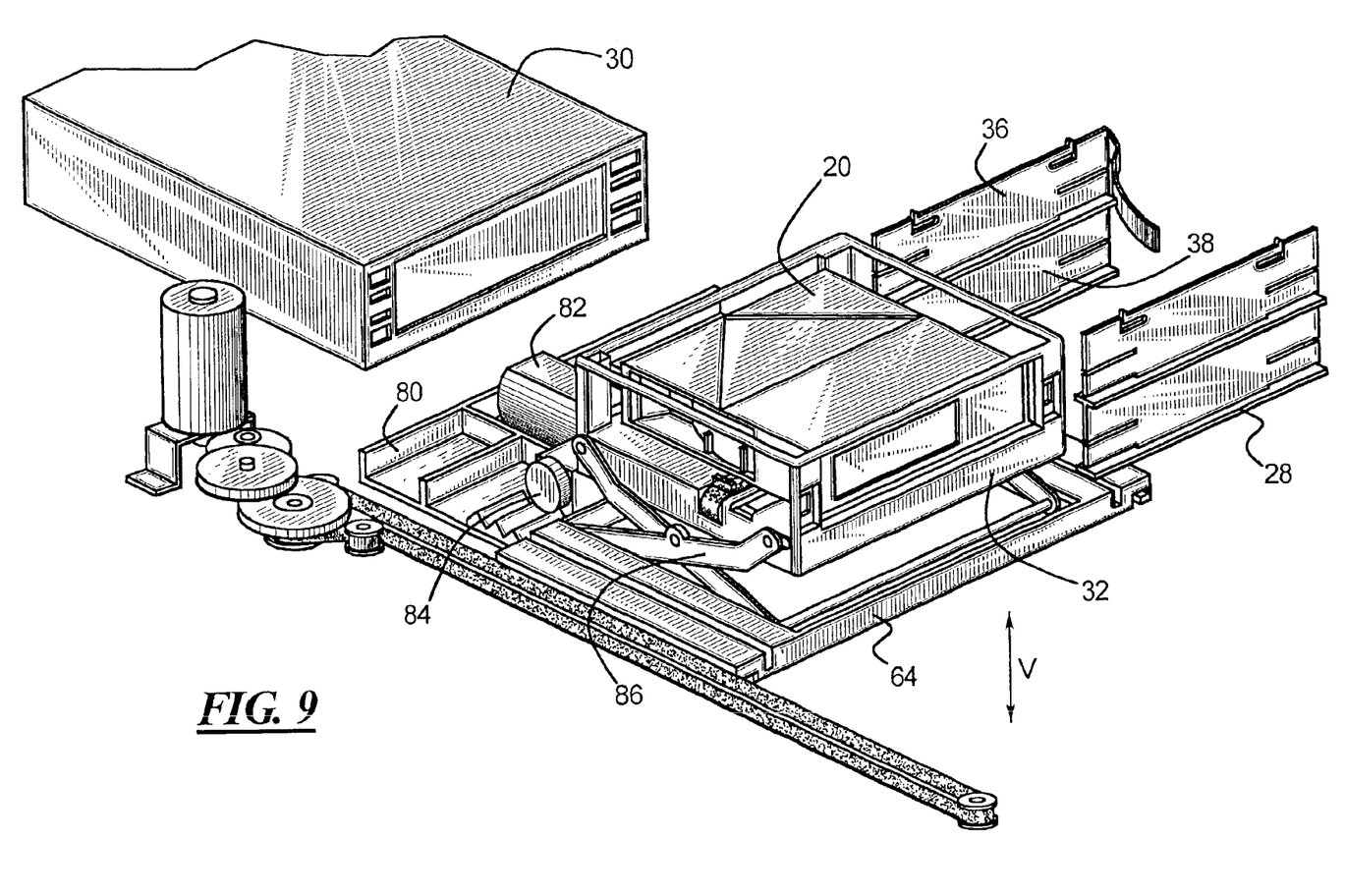
FIG. 9 is a perspective view of the cassette transport apparatus including a view of the moving apparatus for moving the apparatus lengthwise and vertically.

FIG. 9 shows the shuttle 32 above the platform 64 moved away from the position at the front of the tape drive 30 by the motor 74 and belt 66. The platform 64 includes an extension 80 on which is mounted a motor 82. The motor 82 operates an elevator apparatus 84 which includes scissor arms 86 that link the shuttle 32 to the platform 64. Through operation of the motor 82 and elevator apparatus 84, the shuttle 32 is lifted and lowered in the direction V to access upper and lower storage slots 36 and 38 of the storage bins 26 and 28. As mentioned previously, the storage bins 26 and 28 may have additional side-by-side slots and additional vertical levels in which to store the cassettes 20, depending on the storage needs of the user.

Figure 10:
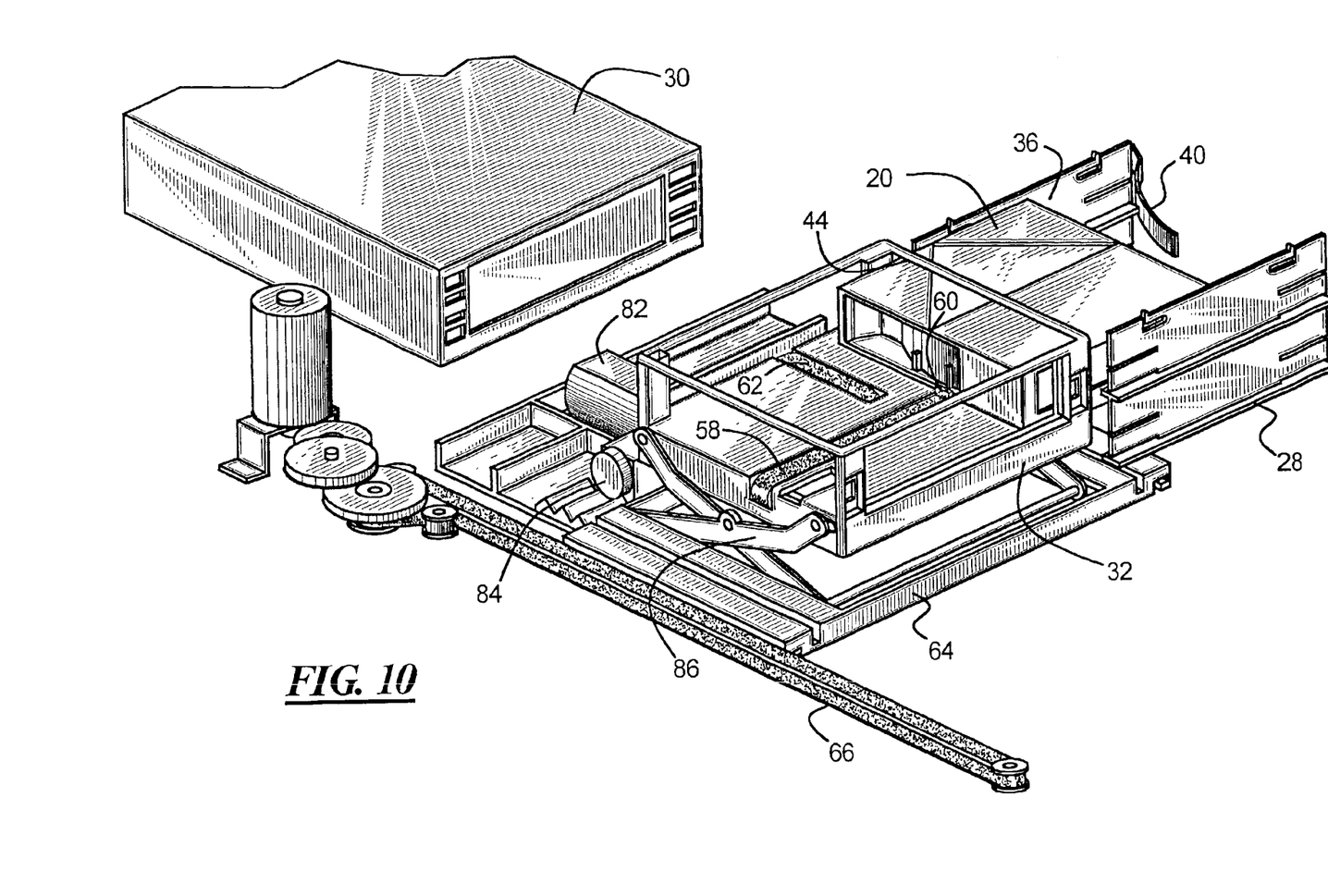
FIG. 10 is a perspective view of the cassette transport apparatus loading a cassette into an upper level of a storage bin.

A view of the shuttle 32 inserting a cassette 20 into the upper slot 36 of the storage bin 28 is shown in FIG. 10. The elevator apparatus 84 has lifted the shuttle 32 into the upper position to access the upper slot 36 and the operation of the belt 66 has moved the shuttle 32 to align the opening 44 with the slot 36. The belt 58 is operated to move the tab 60 against the end of the cassette 20 and push the cassette 20 through the opening 44 and into the slot 36.

Figure 11:
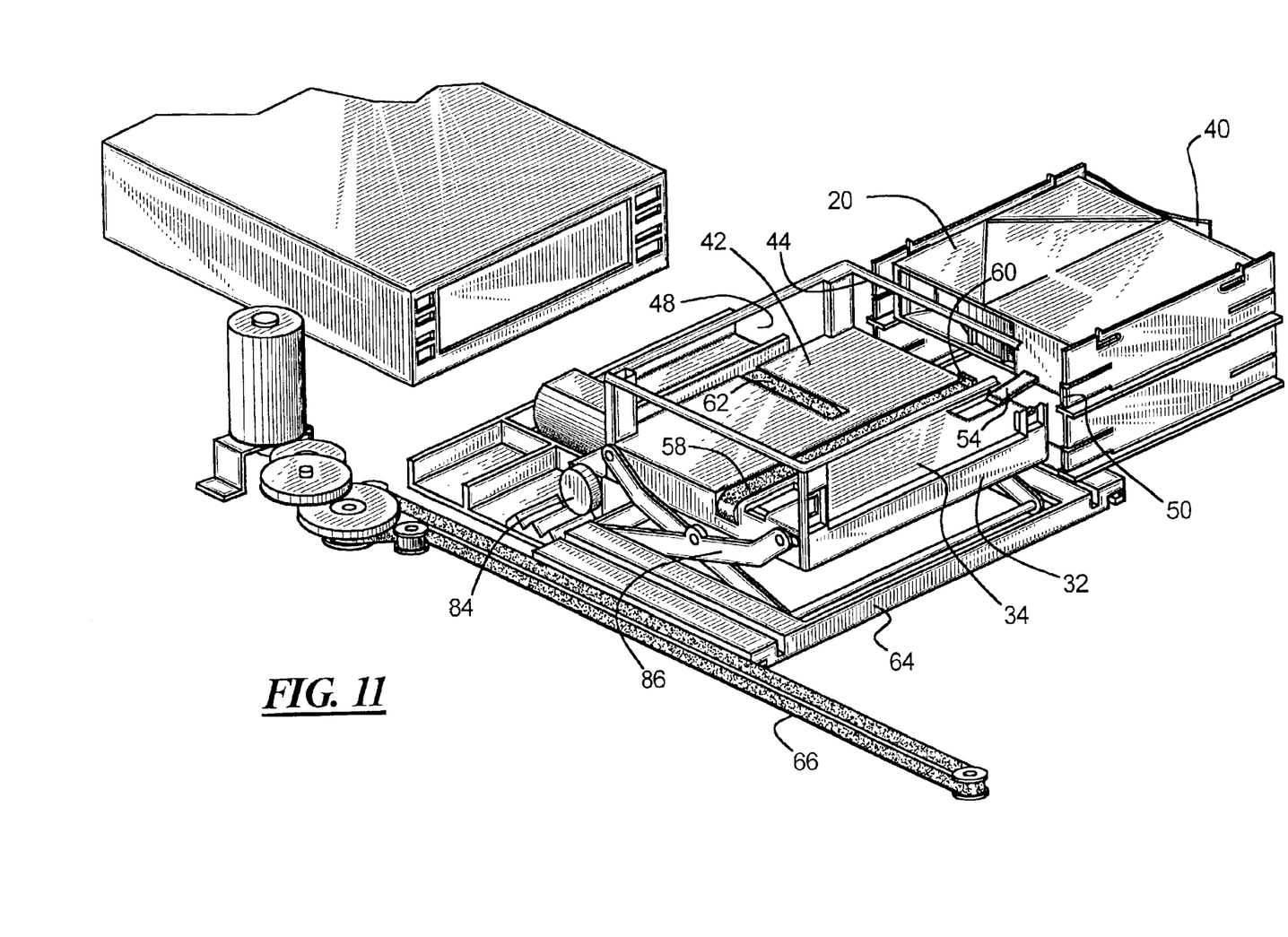
FIG. 11 is a perspective view of the cassette transport apparatus pushing the cassette into the storage bin.

Completion of the insertion operation is shown in FIG. 11, wherein the tab 60 has pushed the cassette 20 as far into the slot 36 as it can, and the kicker element 54 takes over and completes the insertion. The storage operation is finished when the cassette 20 is in the slot 36 far enough to permit the catch 50 to snap into place and engage the end surface of the cassette 20.

The belts 58 and 62 are thus oriented perpendicularly to one another and act to move the cassette 20 through the four openings 34, 42, 44 and 48 of the shuttle. The apparatus is thus operable to move the cassette through four orthogonally disposed openings of the shuttle 32. Rotation if the cassette 20 is not necessary, nor is the mechanism for rotation of the cassette 20.

During movement of the cassette 20 by the belt 58, the belt 62 is moved to keep the tab 78 on the belt 62 out of the way of the cassette movement. Similarly, during movement of the cassette 20 by the belt 62, the belt 58 is moved to keep the tab 60 on the belt 58 out of the way of the cassette movement. The belts provide two axis of motion for the cassette 20.

The present apparatus may be used for moving cassettes from storage slot to storage slot, or moving the cassettes directly from the feed slot to the tape drive. It is contemplated to provide multiple tape drives in the present apparatus, oriented vertically relatively to one another for example, so that multiple read/write operations may be carried out simultaneously.

It is foreseen that the cassette may be moved by some other apparatus than the belts. For example, hooks, grippers, or other apparatus may be provided for handling the cassette 20. It is also contemplated to provide a picker apparatus for the cassette handling. As such, the scope of the invention, in one aspect, is directed to movement of the cassette through the shuttle apparatus in two orthogonal directions, and in particular without reorientation of the cassette. Handling of the cassette is quicker, since no reorientation needs to be performed.

The present invention provides a slim line construction, permitting its use in constricted spaces. It is also versatile and may be used for handling various types and sizes of cassettes and may be adapted to various configurations and orientations of storage bins, tape drives and feed slots.

Although other modifications and changes may be suggested by those skilled in the art, it is the intention of the inventors to embody within the patent warranted hereon all changes and modifications as reasonably and properly come within the scope of their contribution to the art.

We claim:

1. A cassette transport apparatus for feeding a cassette to a cassette drive, comprising:
   a shuttle having a cassette support surface;
   a drive connected to said shuttle and operable to move said shuttle alone a path;
   a storage slot disposed at said path;
   a cassette recording and/or playback apparatus at said path; and
   a cassette transfer apparatus operable to move a cassette over said cassette support surface so as to move the cassette into said cassette recording and/or playback apparatus when said shuttle is positioned by said drive at said cassette recording and/or playback apparatus and to move the cassette into said storage slot when said shuttle is positioned by said drive at said storage slot, said cassette transfer apparatus being operable to move the cassette in four directions from said shuttle, said cassette transfer apparatus including belts mounted in said cassette support surface of said shuttle wherein said cassette transfer apparatus includes a tab on each of said belts.

2. A cassette transport apparatus for feeding a cassette to a cassette drive, comprising:
   a shuttle having a cassette support surface;
   a drive connected to said shuttle and operable to move said shuttle along a path;
   a storage slot disposed at said path;
   a cassette recording and/or playback apparatus at said path; and
   a cassette transfer apparatus operable to move a cassette over said cassette support surface so as to move the cassette into said cassette recording and/or playback apparatus when said shuttle is positioned by said drive at said cassette recording and/or playback apparatus and to move the cassette into said storage slot when said shuttle is positioned by said drive at said storage slot, said cassette transfer apparatus being operable to move the cassette in four directions from said shuttle;
   wherein said shuttle includes a shuttle housing having four openings in four directions from said cassette support surface, said cassette transfer apparatus being operable to selectively move the cassette through any of said four openings.

3. A cassette transport apparatus for feeding a cassette to a cassette drive, comprising:
   a shuttle having a cassette support surface;
   a drive connected to said shuttle and operable to move said shuttle along a path;
   a storage slot disposed at said path;
   a cassette recording and/or playback apparatus at said path;
   a cassette transfer apparatus operable to move a cassette over said cassette support surface so as to move the cassette into said cassette recording and/or playback apparatus when said shuttle is positioned by said drive at said cassette recording and/or playback apparatus and to move the cassette into said storage slot when said shuttle is positioned by said drive at said storage slot, said cassette transfer apparatus being operable to move the cassette in four directions from said shuttle; and
   a feed slot disposed at said path through which the cassette is inserted, said shuttle being positionable at said feed slot to accept a cassette inserted through said feed slot;
   wherein said feed slot and said cassette recording and/or playback apparatus are disposed at opposite ends of said path along which said shuttle moves, said shuttle accepting the cassette which is inserted into said feed slot at one cassette acceptance opening of said shuttle and said shuttle transferring the cassette to the cassette recording and/or playback apparatus through a second cassette acceptance opening of said shuttle which is opposite said one cassette acceptance opening.

4. A method for transporting cassettes between storage bins and a drive, comprising the steps of:

transferring cassettes in four orthogonal directions by a shuttle;

positioning the shuttle in alignment with respective ones of the storage bins and the drive during said transferring step;

wherein said step of transferring includes:

engaging the cassettes by belts on which the cassettes rest, the belts each having a tab projecting therefrom; and moving corresponding ones of the belts to move the cassettes in the four orthogonal directions.

5. A method for transferring cassettes between a drive and storage bins, comprising the step of:

accepting a cassette at an input opening;

drawing the cassette into a shuttle from the input opening along a first direction;

moving the shuttle to a respective one of the drive and the storage bins; and moving the cassette from the shuffle into the respective one of the drive and the storage bins along a direction either substantially parallel or substantially perpendicular to said first direction, wherein said step of moving the cassette moves the cassette into the drive in a direction substantially parallel to said first direction.

* * * * *